(12) United States Patent
Guzman et al.

(10) Patent No.: US 9,092,629 B2
(45) Date of Patent: Jul. 28, 2015

(54) METHOD AND APPARATUS FOR AUTHENTICATING A CODE IMAGE UPON STARTING A DEVICE

(75) Inventors: Jorge H. Guzman, Gaithersburg, MD (US); Scott D. Casavant, Germantown, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 2544 days.

(21) Appl. No.: 11/787,409

(22) Filed: Apr. 16, 2007

(65) Prior Publication Data

US 2008/0256360 A1 Oct. 16, 2008

(51) Int. Cl.
G06F 21/00 (2013.01)
G06F 21/57 (2013.01)

(52) U.S. Cl.
CPC ..................... G06F 21/575 (2013.01)

(58) Field of Classification Search
CPC .................................................... G06F 21/575
USPC ................... 713/176; 705/57, 75; 726/26–33; 380/232; 717/168–173; 455/3.02
See application file for complete search history.

(56) References Cited

U.S. PATENT DOCUMENTS

| | | | | |
|---|---|---|---|---|
| 5,311,591 | A * | 5/1994 | Fischer | 713/156 |
| 5,337,360 | A * | 8/1994 | Fischer | 713/176 |
| 5,907,619 | A * | 5/1999 | Davis | 713/176 |
| 6,105,072 | A * | 8/2000 | Fischer | 719/315 |
| 7,673,297 | B1 * | 3/2010 | Arsenault et al. | 717/168 |
| 2002/0194534 | A1 * | 12/2002 | Largman et al. | 714/13 |
| 2003/0079138 | A1 | 4/2003 | Nguyen et al. | |
| 2004/0268408 | A1 * | 12/2004 | Lee et al. | 725/116 |
| 2006/0136705 | A1 | 6/2006 | Kaimal et al. | |
| 2006/0161761 | A1 * | 7/2006 | Schwartz et al. | 711/216 |
| 2007/0149111 | A1 * | 6/2007 | Nguyen et al. | 455/3.02 |
| 2007/0192610 | A1 * | 8/2007 | Chun et al. | 713/176 |
| 2007/0277037 | A1 * | 11/2007 | Langer | 713/176 |
| 2008/0016358 | A1 * | 1/2008 | Filreis et al. | 713/176 |
| 2008/0215872 | A1 * | 9/2008 | Choi et al. | 713/2 |

FOREIGN PATENT DOCUMENTS

EP 0961193 A 12/1999

OTHER PUBLICATIONS

International Search Report and Written Opinion dated Oct. 9, 2008 in International Application No. PCT/US2008/004911 filed Apr. 16, 2008 by Jorge H. Guzman et al.

* cited by examiner

Primary Examiner — Harunur Rashid
Assistant Examiner — Angela Holmes

(57) ABSTRACT

A device such as a mobile receiving unit (28) may include a memory (74) having a software image (106) therein. The memory (74) has a first stored signature (104) therein. A controller (60) may include a boot loader module (69) that generates a second signature from a portion of the software image (102A-E) less than a full image. The controller (60) authenticates the software image using the first signature and the second signature.

18 Claims, 5 Drawing Sheets

METHOD AND APPARATUS FOR AUTHENTICATING A CODE IMAGE UPON STARTING A DEVICE

TECHNICAL FIELD

The present invention relates generally to a satellite receiving device, and more specifically, to a method and apparatus to perform authentication of a code image.

BACKGROUND

Satellite television has become increasingly popular due to its wide variety of programming. Entertainment in automobiles such as DVD players has also become increasingly popular. It would be desirable to provide a satellite television system for a vehicle so that the wide variety of programming may be enjoyed by the rear passengers.

Set top boxes, sometimes called integrated receiver decoders, are used to receive the satellite signals and decode the signals for playing on a display. Set top boxes continue to become more powerful and provide more functionality. Consequently, the operating systems for the integrated receiver decoders have also become more complex. The software image for these operating systems typically consumes several megabytes of storage.

Some set top boxes, receivers and other embedded systems require authentication of the software image that is to be executed to provide the services or access. Authentication allows the data or content to be protected. To ensure that malicious or modified software is not executed by the set top box, authentication is performed before execution.

The boot up process normally involves a secure boot loader which loads the application software from permanent storage to RAM for execution. In-place software authentication may also be performed. Typically the authentication process is performed for the entire software image and may take tens of seconds up to a few minutes.

In a mobile environment, integrated receiver decoders or receivers are constantly turned on and off. Therefore, consumers may find a substantial delay in the boot-up process undesirable.

In a fixed or home-based system, troubleshooting using a help desk typically entails rebooting the receiver. Reducing the amount of time to reboot will decrease the amount of time service personnel are required to spend with each customer.

SUMMARY

The present disclosure provides a method and apparatus for faster operation after powering the device, or rebooting or resetting of the device by shortening the authentication process. In a mobile application, this is important to reduce the start time of the system after the power cycle. In a mobile application the power may be cycled often compared to conventional home-based type systems.

Reducing start-up time provides a home-based system a reduction in time for calls to the customer support department since rebooting the system is often used to troubleshoot problems. The reduced start time will allow the customer service support department to spend less time on the telephone and thus reduce costs per call.

In one aspect of the disclosure, a method of operating a device comprises storing a software image memory and a first signature associated with the software image, generating a second signature from a portion of the software image less than a full image, authenticating the software image when the first signature and the second signature are equivalent and executing the software image from the memory upon authentication.

In a further aspect of the disclosure, a method of operating a device includes storing a software image in a memory, grouping the software image into a plurality of authentication portions, storing a plurality of signatures, each corresponding to a respective one of the plurality of authentication portions, selecting one of the plurality of authentication portions to form a selected portion and a corresponding signature, generating a signature from the selected portion of the software image, authenticating the software image when the corresponding signature and the second signature are equivalent and executing the software image from the memory upon authentication.

In yet another aspect of the disclosure, a method of operating a device comprises storing a software image in a non-volatile memory, rebooting the device, retrieving the software image from the non-volatile memory and a first signature associated with the software image, storing the software image and the first signature in a dynamic memory, generating a second signature from a portion of the software image less than a full image, authenticating the software image when the first signature and the second signature are equivalent and executing the software image from the dynamic memory upon authentication.

In yet another aspect of the disclosure, a mobile receiving unit for receiving satellite signals includes a satellite tuner and a memory having a software image therein. The memory has a first signature stored therein. The mobile receiving unit further includes a control coupled to the memory and the tuner. The controller generates a second signature from a portion of the software image less than a full image and authenticates the software image when the first signature and the second signature are equivalent. The controller executes the software image after authentication.

Other advantages and features of the present invention will become apparent when viewed in light of the detailed description of the preferred embodiment when taken in conjunction with the attached drawings and appended claims.

DETAILED DESCRIPTION

Figure 1:
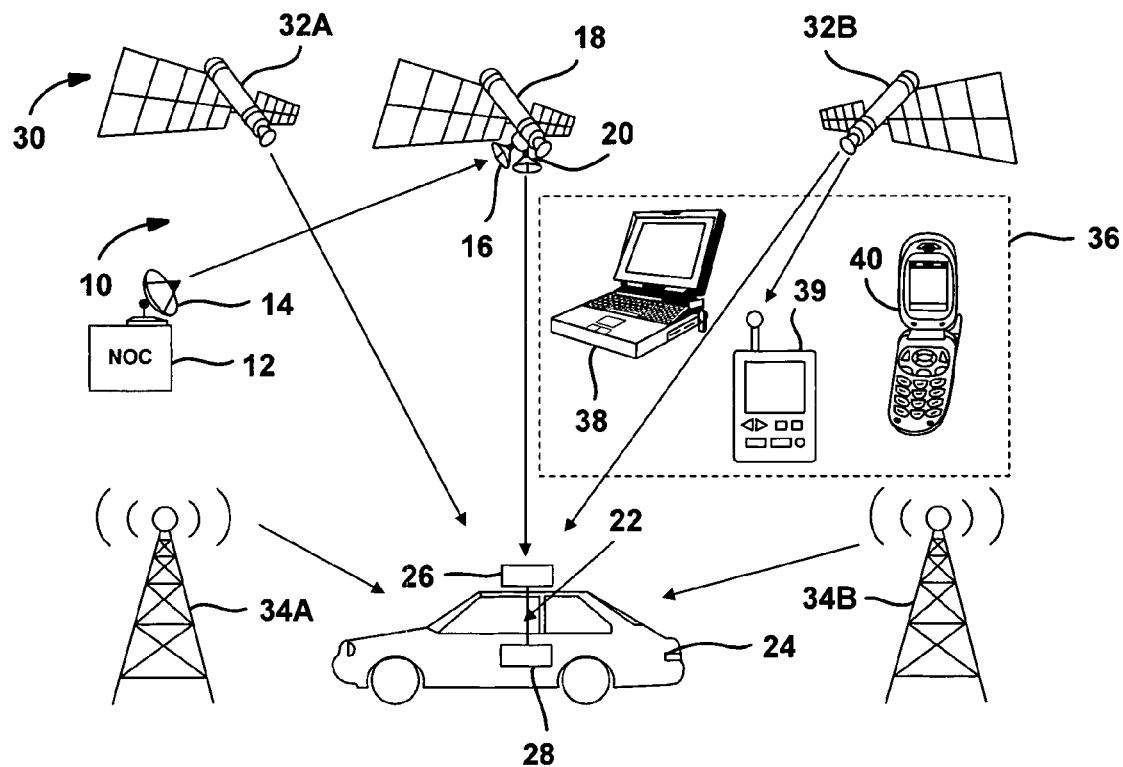
FIG. 1 is a system level view of a satellite broadcasting system according to the present invention.
Figure 1:
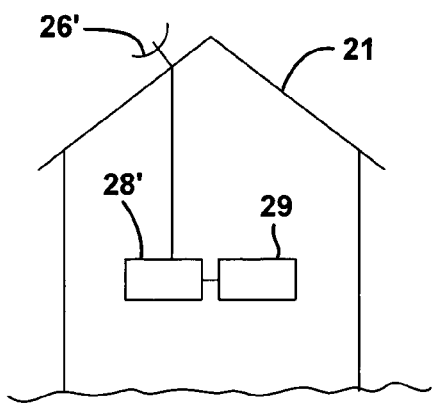

In the following figures the same reference numerals will be used for the same views. The following figures are described with respect to a mobile satellite television system. However, those skilled in the art will recognize the teachings of the present invention may be applied to various types of mobile reception including various land, airborne and water-based type systems. Further, the system may also be applied to fixed receiving devices including home-based devices. The process set forth herein may also be applied to other types of devices that require an authentication process.

Referring now to FIG. 1, a satellite television broadcasting system 10 is illustrated. The satellite television broadcasting system 10 includes a network operations center 12 that generates wireless signals through a transmitting antenna 14 which are received by a receiving antenna 16 of a satellite 18. The wireless signals, for example, may be digital. A transmitting antenna 20 generates signals directed to various receiving systems including stationary systems such as those in a home 21 (or other building) as well as mobile receiving systems 22. The wireless signals may have various types of information associated with them including location information. The wireless signals may also have various video and audio information associated therewith. As illustrated, the mobile receiving system 22 is disposed within an automotive vehicle 24. A receiving antenna 26 receives the wireless signals from the satellite 18 and processes the signals in a mobile receiving unit 28. The receiving unit 28 will be further described below. The home 21 includes a fixed antenna 26' that communicates signals to a receiving unit 28' that provides the signals to a display 29.

The system 10 may also receive location signals from a GPS system 30 that includes a first satellite 32A and a second satellite 32B. Although only two satellites are shown, a typical GPS system includes several satellites, several of which may be in view at any particular time. Triangulation techniques may be used to determine the elevation, latitude and longitude of the system. A locating system may also include cellular towers 34A and 34B that may be used by the mobile receiving system 22 to determine a location. Cellular phones typically include a GPS locating system. As the vehicle 24 moves about, the exact coordinates in latitude and longitude may be used to determine the proper designated marketing area for local television and broadcasting.

The present invention may also be used for displaying various wireless information on a personal mobile device 36 such as a laptop computer 38, a personal digital assistant 39, and a cellular telephone 40. It should be noted that these devices and the automotive-based devices may also receive wireless signals having various types of information associated therewith from the cellular towers 34A and 34B.

Figure 2:
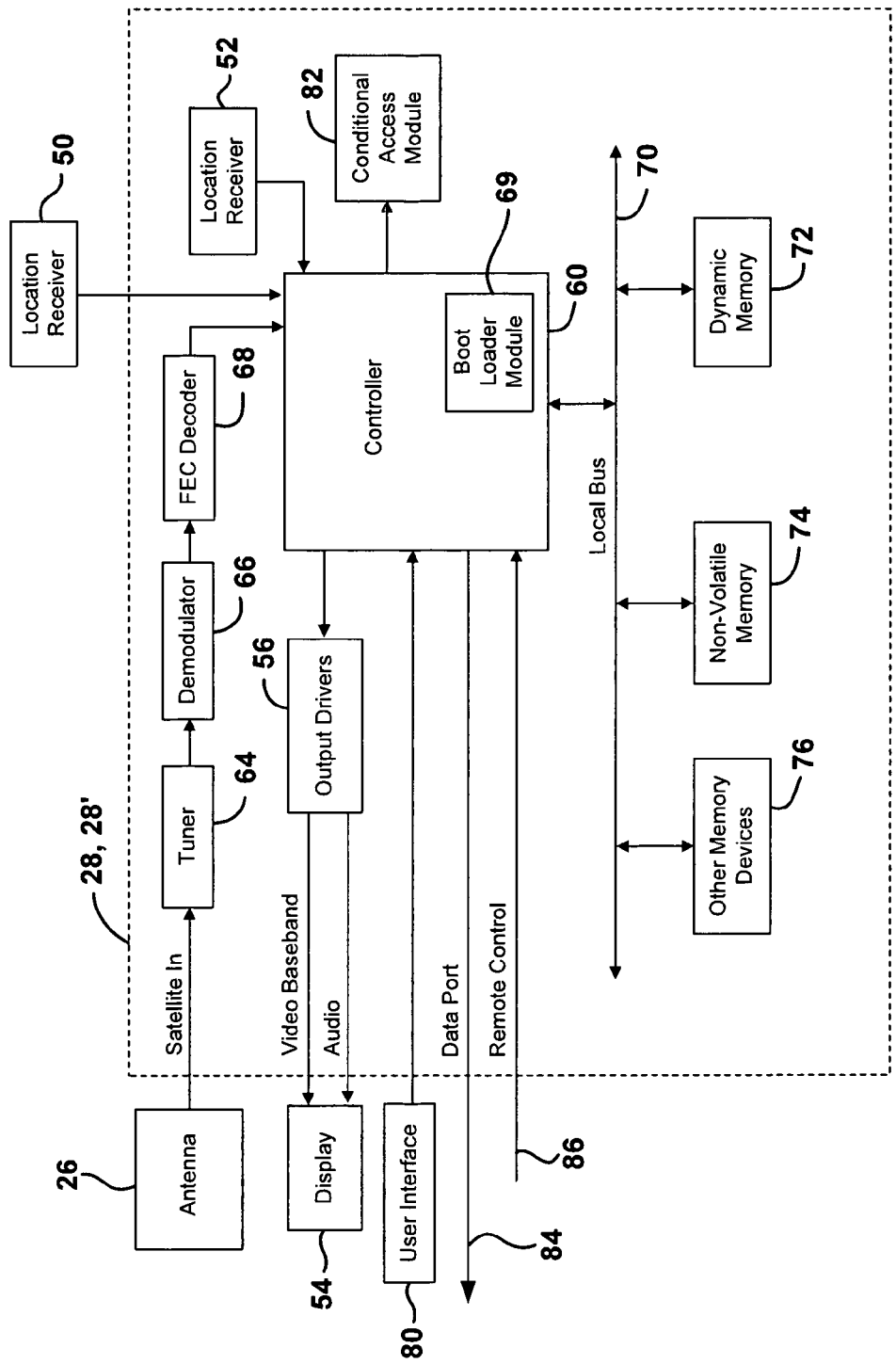
FIG. 2 is a block diagrammatic view of a vehicle having a receiving system according to the present invention.

Referring now to FIG. 2, a receiving unit 22 is illustrated in further detail. Antenna 26 may be various types of antennas including a rotating antenna which is used to track the relative movement of the satellite or other transponding device with respect to the vehicle. The antenna 26 may be a single antenna used for satellite television reception, or a number of antennas such as one for receiving television signals and one coupled to a GPS location receiver 50. The antenna 26 may also be an electronic antenna.

The mobile receiver unit 28 is coupled to antenna 26. The mobile receiving unit 28 may also include a location receiver 52 integrated therein. The location receiver 52 may be a GPS receiver. In a preferred embodiment, only one location receiver 50, 52 may be provided in the system. However, the location receiver 50, 52 may be part of the vehicle 24 or may be part of the mobile receiving system 22, 36. The controller 60 may be coupled directly to location receiver 52 and/or location receiver 50. The mobile receiving unit 28 includes a display 54. The display 54 may be incorporated into the device 36 or within the vehicle 24. The display 54 may include output drivers 56 used for generating the desired audio and video outputs suitable for the particular display 54.

A controller 60 may be a general processor such as a microprocessor. The controller 60 may be used to coordinate and control the various functions of the receiving unit 28. These functions may include a tuner 64, a demodulator 66, a forward error correction decoder 68 and any buffers and other functions. The tuner 64 receives the signal or data from the individual channel. The demodulator 66 demodulates the signal or data to form a demodulated signal or data. The decoder 68 decodes the demodulated signal to form decoded data or a decoded signal. The controller 60 may be similar to that found in current DirecTV set top boxes which employ a chip-based multifunctional controller.

The controller 60 may also include a boot loader module 69. The boot loader module 69 may be responsible for moving the software image such as an operating system from a non-volatile memory to a volatile memory for execution. The boot loader module 69 may also control the authentication of the software image as will be described below. The boot loader 69 is illustrated as part of controller 60. However, the boot loader 69 may be a separate module.

The controller 60 may include or be coupled to a local bus 70. The local bus 70 may be used to couple a dynamic memory 72 such as RAM which changes often and whose contents may be lost upon the interruption of power or boot up. The bus 70 may also be coupled to a non-volatile memory 74. The non-volatile memory may be an in-circuit programmable type memory or a hard disk drive. One example of a non-volatile memory is an EEPROM. One specific type of EEPROM is flash memory. Flash memory is suitable since it is sectored into blocks of data segments that may be individually erased and rewritten.

Other memory devices 76 may also be coupled to local bus 70. The other memory devices may include other types of dynamic memory, non-volatile memory, or may include such devices such as a digital video recorder. The display 54 may be changed under the control of controller 60 in response to the data in the dynamic memory 72 or non-volatile memory 74.

The controller 60 may also be coupled to a user interface 80. User interface 80 may be various types of user interfaces such as a keyboard, push buttons, a touch screen, a voice activated interface, or the like. User interface 80 may be used to select a channel, select various information, change the volume, change the display appearance, or other functions. The user interface 80 is illustrated as part of the mobile receiving unit. However, should the unit be incorporated into a vehicle, the user interface 80 may be located external to the mobile receiving unit such as dial buttons, voice activated system, or the like incorporated into the vehicle and interface with the mobile receiving unit.

A conditional access module card 82 (CAM) may also be incorporated into the mobile receiving unit. Access cards such as a conditional access module (CAM) cards are typically found in DirecTV units. The access card 82 may provide conditional access to various channels and wireless signals generated by the system. Not having an access card or not having an up-to-date access card or module 82 may prevent the user from receiving or displaying various wireless content from the system.

A data port 84 may be coupled to the controller 60 for transmitting or receiving information from a device. A remote control 86 may be used as one type of interface device. The remote control 86 provides various data to the controller 60.

Although a mobile unit is illustrated, the above description is equally applicable to fixed or stationary systems. The location receivers 50, 52 may be eliminated in a fixed system.

Figure 3:
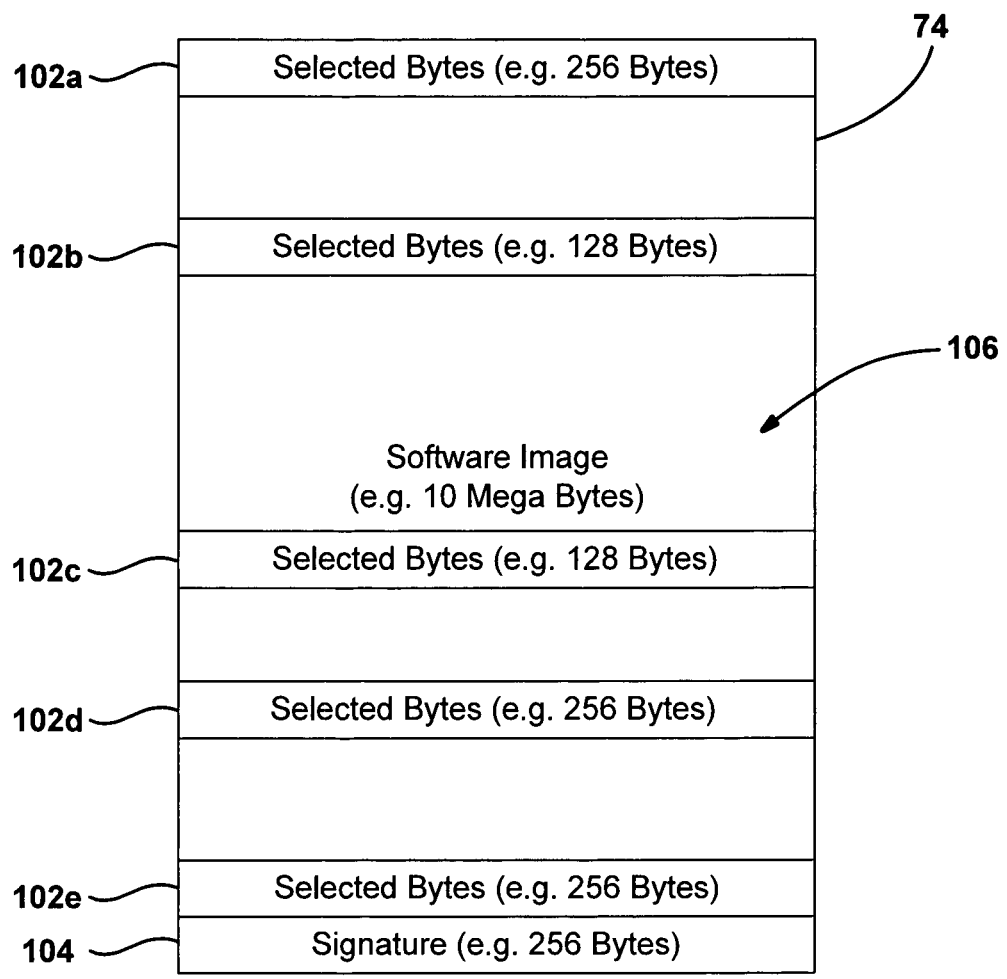
FIG. 3 is a diagrammatic view of memory portions for authentication in the present disclosure.

Referring now to FIG. 3, a non-volatile memory 74 is illustrated having several authentication segments or portions 102a, 102b, 102c, 102d, and 102e. The authentication portions may be together or spaced apart. The particular authentication portions 120a-e are pre-selected or pre-determined during development of the system. A signature portion 104 of memory 74 is also illustrated. Rather than using the entire software image 106, the authentication portions 102a-102e may be used for authentication. A secret algorithm or the like may be used to generate a second signature from the authentication portions 102a-102e. The signature obtained from the authentication portions 102a-102e is compared to the first signature 104 for authentication. As can be seen, various numbers of bytes may be selected for each of the authentication portions. Authentication portion 102A may, for example, be 256 bytes. Likewise, authentication portions 102D and 102E are also illustrated as 256 bytes. Authentication portions 102B and 102C are illustrated as 128 bytes. The number of bytes may vary. The signature 104 is also illustrated as 256 bytes. As can be seen, by using only the selected authentication portions rather than the entire 10 megabyte software image 106, a significant reduction in the authentication time may be achieved. Various methods for generating a signature are known to those skilled in the art. As is illustrated, the number of bytes selected is one kilobyte from the 10 megabytes. Thus, a 10,000-fold reduction in authentication time may be achieved by using one kilobyte rather than the entire 10 megabyte software image.

Figure 4:
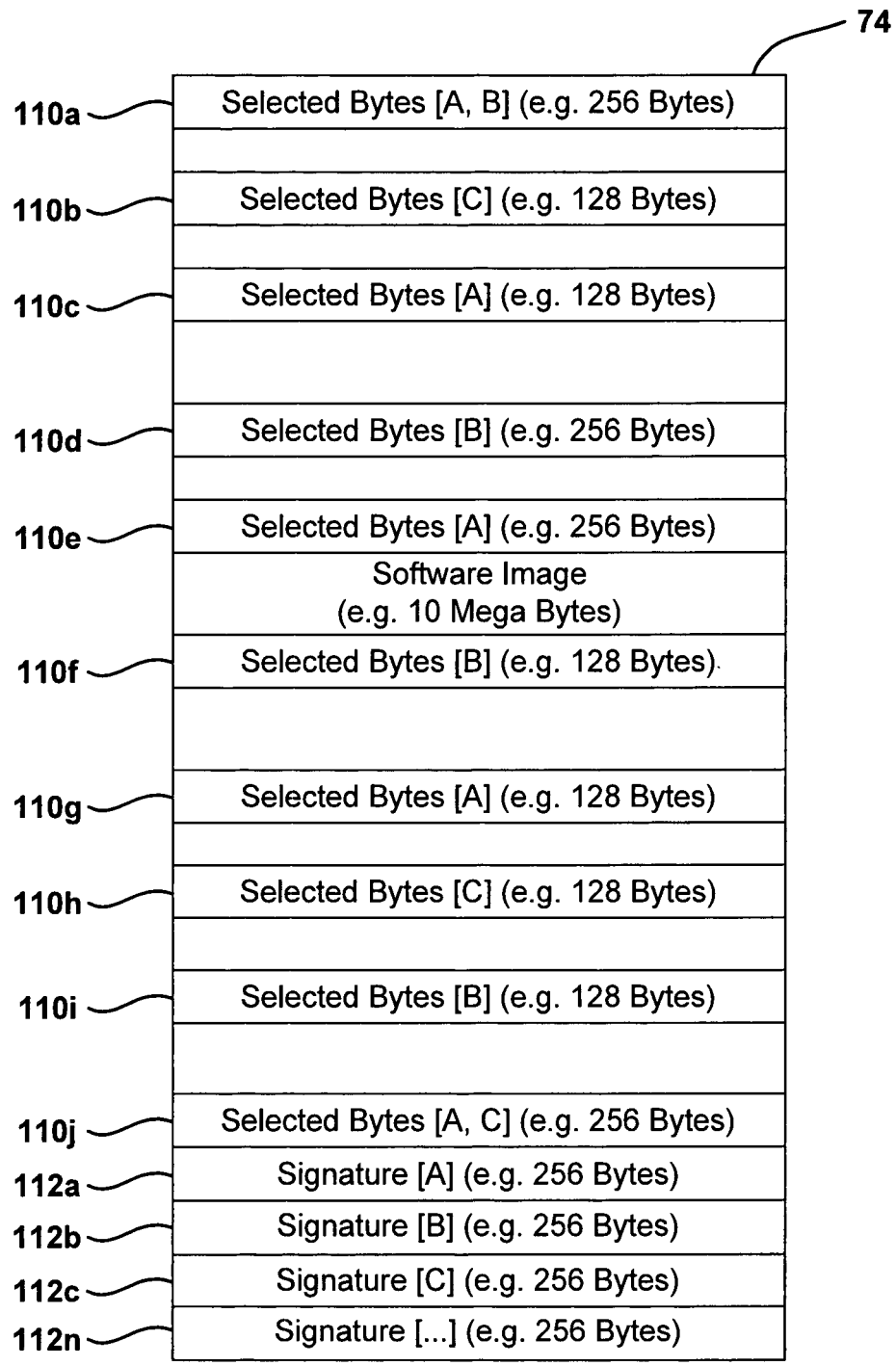
FIG. 4 is a second diagrammatic view of memory portions for authentication according to an alternative method in the present disclosure.

Referring now to FIG. 4, a second embodiment of memory 74 is illustrated. In this embodiment, several authentication portions 110a-110j are illustrated. In this embodiment, the boot loader authenticates selected bytes of the software image in memory before it passes control of execution of this image to the controller. The computed authentication signature is compared against the stored signature with the secret algorithm. In this embodiment, three groups of selected bytes are illustrated and are denoted by A, B, and C. Authentication portion 110a, 110c, 110e, 110g, and 110j correspond to authentication portions corresponding to the first (A) signature 112a. Authentication portions 110a, 110d, 110f, and 110i each correspond to the second (B) signature 112b. Authentication portions 110b, 110h, and 110j correspond to signature 112c. In this embodiment, the boot loader may check only one set (A, B, or C) at every boot time and randomly select which set to check. This alternative method has added security in case the software image is modified but the selected bytes are left intact so that the signature check would pass. To circumvent this method, rogue software must include all of the selected byte groups which would, therefore, increase the security of the system. The decreased amount of time from the previous embodiment also corresponds in this embodiment as well. Thus, substantial reduction in the amount of time for booting a system is set forth.

Figure 5:
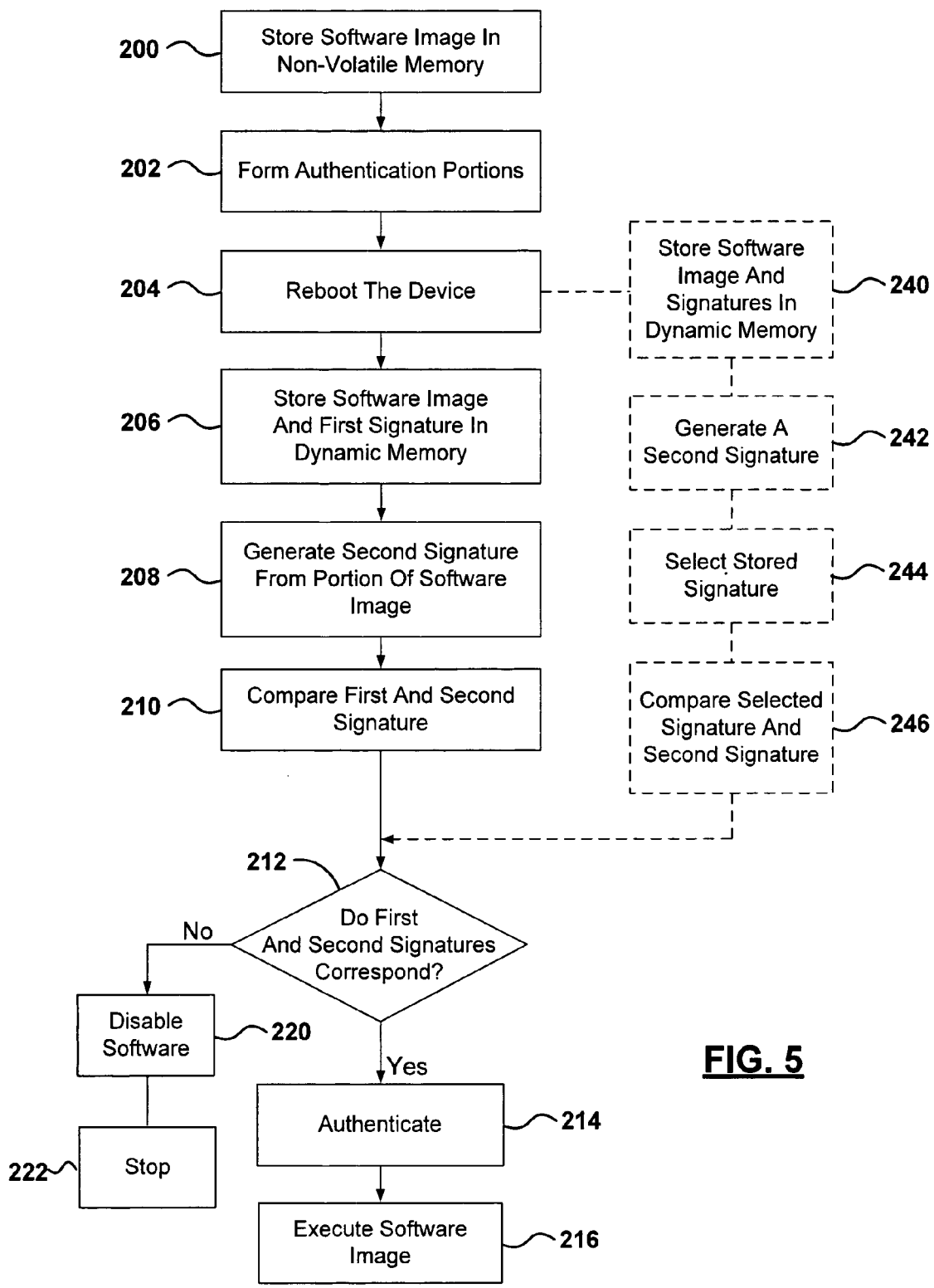
FIG. 5 is a flow chart illustrating a method of authenticating code images.

Referring now to FIG. 5, a method of operating a system or device is set forth. In step 200, software is stored in non-volatile memory. In step 202, authentication portions are formed. The authentication portions may be pre-identified or pre-determined. For example, the authentication portions may be burned into the non-volatile memory during manufacture. In step 204, upon rebooting of the device, the need for authentication of the software image is required. In step 206, the software image is stored and a first signature is also stored in a non-volatile memory. The software image may be retrieved from a non-volatile memory for execution. In step 208, a second signature is generated from a portion of the software image less than the full software image. As mentioned above, the authentication portion may be a small portion compared to the entire software image. Also, the authentication portions may be non-consecutive or consecutive portions. In step 210, the first signature and second signature are compared. The second signature may be generated from various algorithms known to those skilled in the art. Examples of general types of signature generation portions include: DSA, RSA, One-Way Hash functions, etc.

In step 212, if the first and second signatures correspond, step 214 authenticates the software image and step 216 allows the software image to be executed. In step 212, if the first and second signatures do not correspond, step 220 disables the software and stops the process in step 222.

The first and second signatures may correspond in different scenarios. First, if they are the same or equivalent, authentication may take place. Other examples may be used to determine if the signatures correspond, including but not limited, to XORing or other processing of the signatures and if the resulting number is a predetermined number, the system is authenticated. Also a secret algorithm may be used to return a "pass" or "fail" based on the signatures. Of course, other ways may be used using the two signatures.

Referring back to step 204, when the device is rebooted, the software image and multiple signatures may be stored in a dynamic memory in step 240. In step 242, a second signature may be generated from the authentication portions. That is, less than the full number of authentication portions may be used to generate a signature. The authentication portions may be randomly chosen. In step 244, the stored signature is selected that corresponds with the authentication portions used. In step 246, the selected signature and the second signature are compared. The system them continues with steps 212-220 as described above. Steps 240-246 may be alternately performed instead of steps 206-210.

As can be seen, the number of authentication portions is substantially less than the software image. In the above examples, a 10,000 times reduction in the speed of authentication is achieved. However, various amounts of reduction and various sizes of authentication portions may be chosen, depending on the particular system and the size and number of authentication portions. The present system has the advantage of being capable of reducing the boot times of various types of devices including satellite-receiving devices. The satellite-receiving devices may be both fixed and mobile.

While particular embodiments of the invention have been shown and described, numerous variations and alternate embodiments will occur to those skilled in the art. Accordingly, it is intended that the invention be limited only in terms of the appended claims.

What is claimed is:

1. A method of operating a device having an operating system, said method comprising:
   storing a software image for operating the operating system in a memory of the device, said software image comprising a plurality of predetermined authentication portions determined during operating system development;
   storing a first signature associated with the software image in the memory;
   generating a second signature from the plurality of predetermined authentication portions of the software image less that is than a full image;
   authenticating the software image by comparing the first signature from the memory and the second signature; and
   executing the software image upon authentication.

2. A method as recited in claim 1 wherein the memory is a dynamic memory.

3. A method as recited in claim 2 wherein the memory comprises a non-volatile memory.

4. A method as recited in claim 1 wherein the plurality of predetermined authentication portions is spaced apart in the software image.

5. A method of operating a device comprising an operating system, said method comprising:
- storing a software image for operating the operating system in a memory of the device;
- grouping the software image into a plurality of predetermined different authentication portions;
- storing a plurality of signatures each corresponding to a respective one of the plurality of the predetermined different authentication portions in the memory of the device;
- selecting one of the plurality of the predetermined different authentication portions to form a selected portion and to form a corresponding signature from the plurality of signatures;
- generating a second signature from one of the plurality of selected portions of the software image less than the a full image;
- authenticating the software image by comparing the corresponding signature and the second signature; and
- executing the software image upon authentication.

6. A method of operating a device comprising:
- storing a software image in a memory;
- grouping the software image into a plurality of authentication portions;
- storing a plurality of signatures each corresponding to a respective one of the plurality of authentication portions;
- randomly selecting one of the plurality of predetermined authentication portions to form a selected portion and a corresponding signature;
- generating a second signature from the selected portion of the software image;
- authenticating the software image using the corresponding signature and the second signature; and
- executing the software image upon authentication.

7. A method as recited in claim 6 wherein the memory is a non-volatile memory.

8. A method as recited in claim 7 wherein the memory comprises read-only memory.

9. A method as recited in claim 6 wherein generating a second signature comprises generating the second signature from the plurality of predetermined authentication portions.

10. A method as recited in claim 6 wherein the plurality of predetermined authentication portions is spaced apart in the software image.

11. A method of operating a device comprising an operating system, said method comprising:
- storing a software image for operating the operating system in a non-volatile memory of the device, said software image comprising a plurality of predetermined authentication portions determined during operating system development;
- rebooting the device;
- retrieving the software image from the non-volatile memory and a first signature associated with the software image;
- storing the software image and the first signature in a dynamic memory of the device;
- generating a second signature from the plurality of predetermined authentication portions of the software image less than a full image;
- authenticating the software image by comparing the first signature from the dynamic memory and the second signature; and
- executing the software image from the dynamic memory upon authentication.

12. A method as recited in claim 11 wherein rebooting comprises clearing the dynamic memory.

13. A method as recited in claim 11 wherein authenticating comprises authenticating when the first signature and second signature are equivalent.

14. A method as recited in claim 11 wherein the plurality of predetermined authentication portions is spaced apart in the software image.

15. A receiving unit for receiving satellite signals comprising:
- an operating system;
- a satellite tuner;
- a memory having a software image therein, said memory having a first signature stored therein, said software image operating the operation system and said software image comprising a plurality of predetermined authentication portions determined during operating system development; and
- a controller coupled to the memory and the tuner, said controller generating a second signature from the plurality of predetermined portions of the software image that is less than a full image, authenticating the software image using the first signature from the memory and the second signature, and executing the software image after authentication.

16. A receiving unit as recited in claim 15 wherein the memory comprises a flash memory.

17. A receiving unit as recited in claim 15 wherein the memory comprises a RAM.

18. A receiving unit as recited in claim 15 wherein the plurality of predetermined authentication portions are spaced apart in the software image.

* * * * *